United States Patent [19]

Imazeki et al.

[11] 4,334,272
[45] Jun. 8, 1982

[54] TRACER CONTROL SYSTEM

[75] Inventors: Ryoji Imazeki; Etsuo Yamazaki, both of Hachioji, Japan

[73] Assignee: Fujitsu Fanuc Limited, Tokyo, Japan

[21] Appl. No.: 118,217

[22] Filed: Feb. 4, 1980

[30] Foreign Application Priority Data

Feb. 9, 1979 [JP] Japan .................... 54-14098

[51] Int. Cl.$^3$ .................... G06F 15/46; G05B 19/33
[52] U.S. Cl. .................... 364/474; 318/571; 318/578; 364/520; 364/551
[58] Field of Search .................... 364/474, 520, 551; 318/571, 578, 162; 409/79, 98, 99, 127, 126, 130; 33/174 L, 174 P, 174 PC

[56] References Cited

U.S. PATENT DOCUMENTS

| | | | |
|---|---|---|---|
| 3,609,322 | 9/1971 | Burnett et al. | 318/578 X |
| 3,875,382 | 4/1975 | Cutler | 364/474 |
| 3,976,928 | 8/1976 | Wenzel | 318/578 |
| 4,064,445 | 12/1977 | Wenzel | 318/578 |
| 4,084,244 | 4/1978 | Floter | 364/474 |

Primary Examiner—Joseph F. Ruggiero
Attorney, Agent, or Firm—Staas & Halsey

[57] ABSTRACT

In a system which performs tracer control through the use of a displacement signal of a tracer head tracing the surface of a model, there is provided: a first coordinate conversion circuit in which signals representative of the cosine and sine of the azimuth angle of the feed axis in the X-Y plane of a mechanical coordinate system and X- and Y-axis displacement signals of the tracer head are respectively multiplied by multipliers and the output signals from the multipliers are added together to thereby obtain a displacement component signal of the feed axis; and a second coordinate conversion circuit in which a signal for controlling the feed rate in the feed axis and the signals representative of the cosine and sine of the azimuth angle of the feed axis are respectively multiplied by multipliers to obtain feed rates along the X- and the Y-axis. By controlling the feed rates in the X- and the Y-axis direction with the output signal from the second coordinate conversion circuit, the feed axis in the mechanical coordinate system may be chosen at will.

6 Claims, 2 Drawing Figures

TRACER CONTROL SYSTEM

BACKGROUND OF THE INVENTION

1. Field of the Invention

This invention relates to a tracer control system which permits arbitrary setting up of the directions of feed.

2. Description of the Prior Art

For surface profiling (180° profiling), the direction of feed is usually defined in the X- or Y-axis direction, but according to the configuration of a model, the accuracy of profiling may sometimes be enhanced by a feed at an arbitrary angle rather than in the X- or Y-axis directions. For example, in the case of the model being square-shaped, it is difficult to profile its four-cornered portions in the X- or Y-axis directions; to avoid this difficulty, there has been proposed a tracer control system which performs the feed at an arbitrary angle to the X- or Y-axis.

An example of the conventional system is such as disclosed in Japanese Patent Disclosure No. 33579/75 in which two coordinate conversion circuits, each formed by a resolver, are mechanically interlocked with each other, thereby to set up the direction of feed.

In such a system, however, since the two coordinate conversion circuits are mechanically ganged with each other for setting up the direction of feed, a high degree of mechanical accuracy, (and consequently a complicated arrangement) is needed for accurate profiling.

SUMMARY OF THE INVENTION

It is an object of the present invention to provide a tracer control system with a simple structure which permits feed in an arbitrary direction with high accuracy.

Briefly stated, according to the present invention, in a system in which tracer control is effected through utilization of a displacement signal of a tracer head, there are provided: a first coordinate conversion circuit, in which signals representative of the cosine and the sine of the azimuth angle of the feed axis in the X-Y plane of a mechanical coordinate system, and displacement signals of the tracer head along the X- and the Y-axes are respectively multiplied by multipliers, and the output signals from the multipliers are added together by an adder to obtain a displacement component signal along the feed axis, and a second coordinate conversion circuit, in which a signal for controlling the feed rate along the feed axis, and the signals representative of the cosine and the sine of the azimuth angle of the feed axis, are respectively multiplied by multipliers to convert the signal for controlling the feed rate along the feed axis into signals for controlling the feed rates in the X- and the Y-axis directions. By controlling the feed rates in the X- and the Y-axis direction with the output signal from the second coordinate conversion circuit, the direction of the feed axis in the mechanical coordinate system is set up as desired.

DESCRIPTION OF THE PREFERRED EMBODIMENTS

Figure 1:
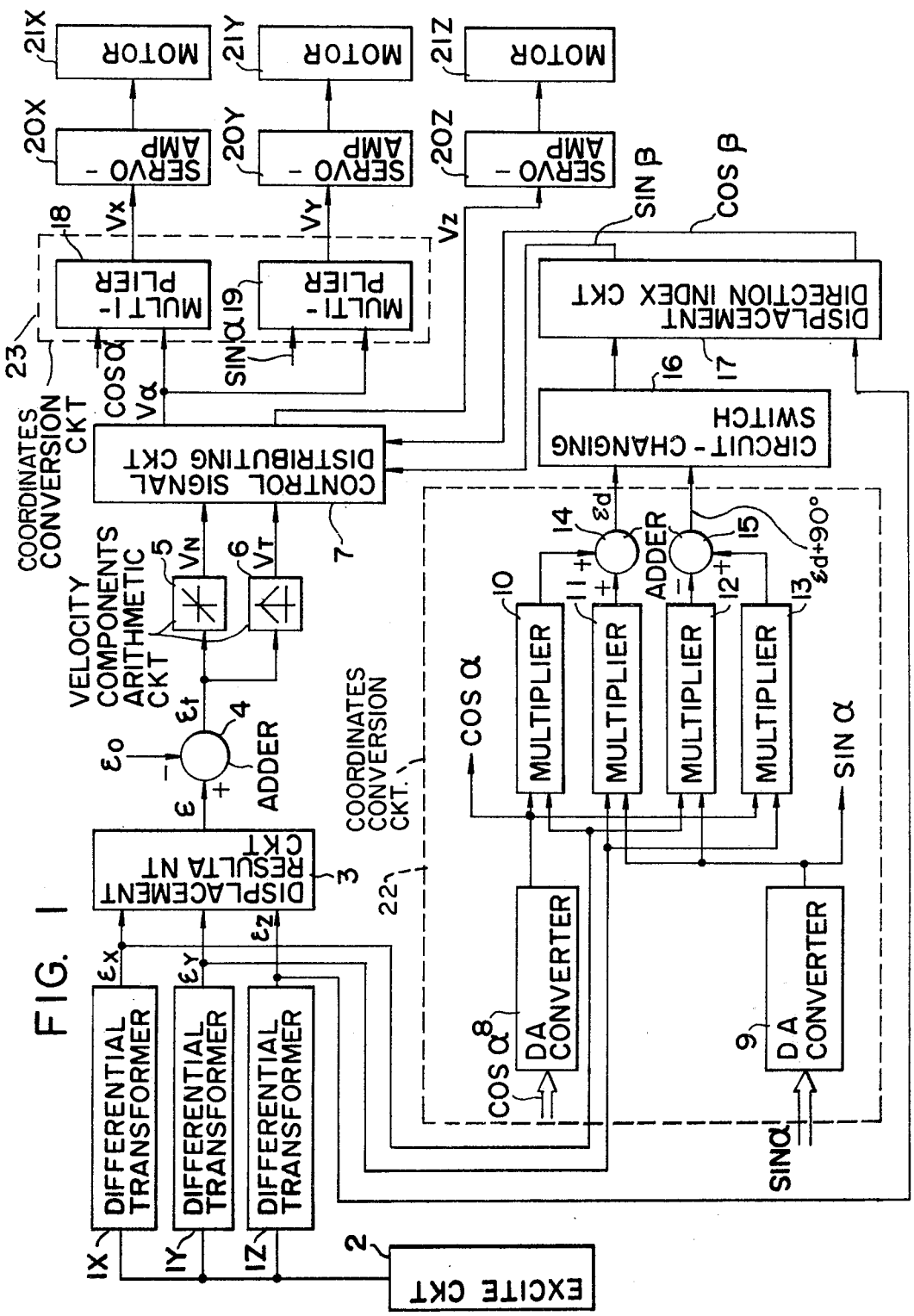
FIG. 1 is a block diagram illustrating an embodiment of the present invention.

FIG. 1 shows differential transformers 1X, 1Y, and 1Z of a tracer head; a differential transformer excite circuit 2; a displacement resultant circuit 3; adders 4, 14 and 15; velocity component arithmetic circuits; 5 and 6 a control signal distributing circuit 7; DA (digital to analog) converters; 8 and 9 multipliers 10 to 13, 18 and 19; a circuit-changing switch 16; a displacement direction index circuit 17; servo-amplifiers 20X, 20Y and 20Z; motors 21X and 21Z; coordinate conversion circuits 22 and 23 surrounded by the broken lines.

Figure 2:
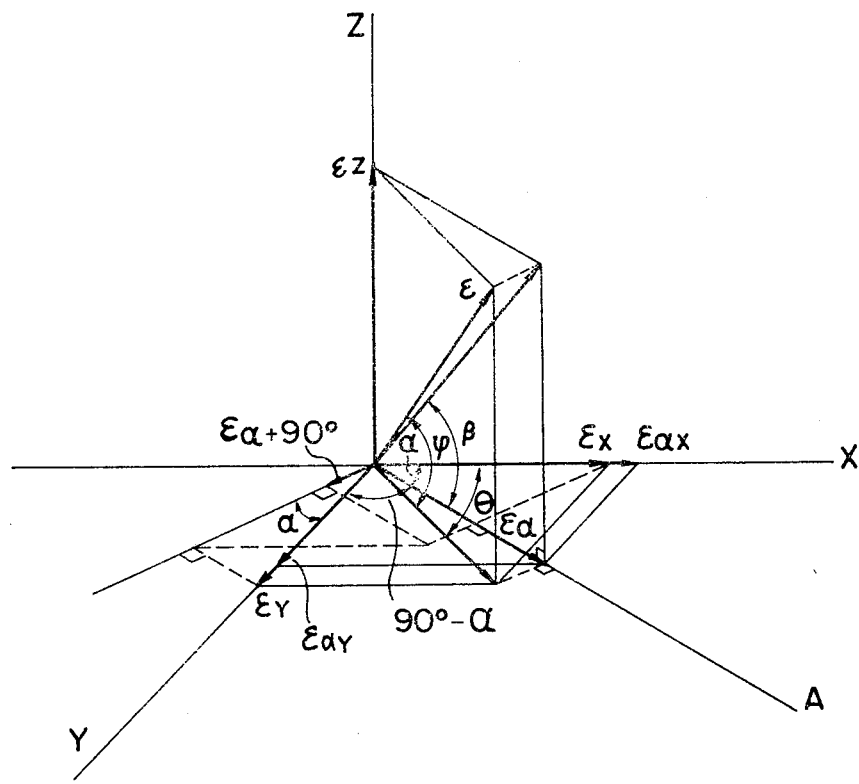
FIG. 2 is a vector diagram showing the relationships of signals in the embodiment of FIG. 1.

The differential transformers 1X, 1Y and 1Z are excited by the excite circuit 2 at an a.c. frequency f. Displacement signals $\epsilon_x$, $\epsilon_y$ and $\epsilon_z$, which are yielded by displacement of the tracer head while in contact with the surface of a model (not shown), are components of a displacement vector $\vec{\epsilon}$ of the tracer head as shown in FIG. 2, and are given, with $2\pi ft = \omega t$, as follows:

$$\epsilon_x = \epsilon \cos \phi \cos \theta \sin \omega \qquad (1)$$

$$\epsilon_y = \epsilon \cos \phi \sin \theta \sin \omega t \qquad (2)$$

$$\epsilon_z = \epsilon \sin \phi \sin \omega t \qquad (3)$$

In ordinary profiling, a resultant displacement $\epsilon = \sqrt{\epsilon_x^2 + \epsilon_y^2 + \epsilon_z^2}$ is obtained by the displacement resultant circuit 3; a difference $\epsilon_t$ between the resultant displacement $\epsilon$ and a reference displacement $\epsilon_O$ is detected by the adder 4; a feed rate $V_Z$ in the Z-axis direction and a feed rate $V_X$ in the X-axis direction are determined by the velocity component arithmetic circuits 5 and 6; and the feed of the tracer head and a cutter tool is controlled according to the abovesaid feed rates $V_Z$ and $V_X$ so that the abovementioned difference $\epsilon_t$ may be reduced to zero.

In the case of profiling in an arbitrary direction, for example, in the A-axis direction shown in FIG. 2, an azimuth angle $\alpha$ is set up by the coordinate conversion circuits 22 and 23. The coordinate conversion circuit 22 comprises DA converters 8 and 9, the multipliers 10 to 13 and the adders 14 and 15. The azimuth angle $\alpha$ is set up by applying to the DA converter 8 a digital signal representing $\cos \alpha$ and to the DA converter 9 a signal representing $\sin \alpha$. The coordinate conversion circuit 23 comprises the multipliers 18 and 19 and is supplied with the output signals from the DA converters 8 and 9.

The DA converter 8 converts the digital signal representing $\cos \alpha$ into an analog signal for input to the multipliers 10, 13 and 18, and the DA converter 9 similarly converts the digital signal representing $\sin \alpha$ into an analog signal for input to the multipliers 11, 12 and 19. The multipliers 10 and 12 are each supplied with the displacement signal $\epsilon_x$ in the X-axis direction from the differential transformer 1X, and the multipliers 11 and 13 are each supplied with the displacement signal $\epsilon_y$ in the X-axis direction from the differential transformer 1Y. The output signals from the multipliers 10 and 11 are supplied to the adder 14 to derive therefrom a signal $\epsilon_\alpha$ given by the following expression (4). The output signals from the multipliers 12 and 13 are provided to the adder 15 to derive therefrom a signal $\epsilon_{\alpha+90°}$ given by the following expression (5).

$$\epsilon_\alpha = \epsilon_x \cos \alpha + \epsilon_y \sin \alpha \qquad (4)$$

$$\epsilon_{\alpha+90°} = \epsilon_y \cos\alpha - \epsilon_x \sin\alpha \quad (5)$$

$$= \epsilon_x \cos(\alpha + 90°) + \epsilon_y \sin(\alpha + 90°)$$

FIG. 2 shows the vector relationships of the abovesaid signals. The X-axis direction component $\epsilon_{\alpha x}$ and the Y-axis direction component $\epsilon_{\alpha y}$ of the signal $\epsilon_\alpha$ given by the expression (4) become $\epsilon_\alpha \cos\alpha$ and $\epsilon_\alpha \sin\alpha$, respectively; and the X-axis direction component $\epsilon_{(\alpha+90°)x}$ and the Y-axis direction component $\epsilon_{(\alpha+90°)y}$ of the signal $\epsilon_{\alpha+90°}$ given by the expression (5) become $\epsilon_{\alpha+90°} \cos(\alpha+90°)$ and $\epsilon_{\alpha+90°} \sin(\alpha+90°)$, respectively. The circuit-changing switch 16 selectively applies the signals $\epsilon_\alpha$ and $\epsilon_{\alpha+90°}$ to the displacement direction index circuit 17. By changing over the signals $\epsilon_\alpha$ and $\epsilon_{\alpha+90°}$ to each other, the azimuth angle can be changed through 90°.

In the case of the signal $\epsilon_\alpha$ of the expression (4) being outputted from the circuit-changing switch 16, the displacement direction index circuit 17 determines an angle $\beta$ in the plane A-Z from the displacement component signal $\epsilon_\alpha$ of the coordinate axis A and the displacement signal $\epsilon_z$ of the Z axis applied from the differential transformer 1Z and provides a cosine signal $\cos\beta \sin\omega t$ and a sine signal $\sin\beta \sin\omega t$ corresponding to the direction of displacement. The sine signal and the cosine signal thus obtained and a normal velocity $V_N$ and a tangential velocity $V_T$ derived from the known velocity component arithmetic circuits 5 and 6 are applied to the known control signal distributing circuit 7, from which control signals for the velocity $V_\alpha$ in the A-axis direction and the velocity $V_z$ in the Z-axis direction are distributed, for example, by a multiplier, a mixer and so forth of the circuit 7. The control signal for the velocity $V_z$ in the Z-axis direction is provided to the servo-amplifier 20Z, the output from which is supplied to the motor 21Z to drive it.

The control signal for the velocity $V_\alpha$ in the A-axis direction is applied to the multipliers 18 and 19 forming the coordinate conversion circuit 23. Since the multipliers 18 and 19 are respectively supplied with the output signals $\cos\alpha$ and $\sin\alpha$ from the DA converters 8 and 9, the output signals from the multipliers 18 and 19 are those converted to control signals for the velocity $V_x$ in the X-axis direction and the velocity $V_y$ in the Y-axis direction, respectively. These control signals are respectively applied to the servo-amplifiers 20X and 20Y, whose outputs are provided to the motors 21X and 21Y to drive them. By the motors 21X and 21Y, the feed is carried out in the A-axis direction. The feed axis (A axis) can freely be set up by the coordinate conversion circuits 22 and 23. The coordinate conversion circuit 22 has the DA converters 8 and 9, and the data for setting up the direction of feed is applied as digital data via the DA converters 8 and 9, so that it is possible to store the digital data and read it therefrom by a program. Accordingly, the feed direction can also be changed automatically.

As has been described in the foregoing, the tracer control system of this invention comprises multipliers for multiplying a signal representative of the angle of the feed axis (A axis) and X- and Y-axis displacement signals of a tracer head, adders for adding output signals from the multipliers, a first coordinate conversion circuit for producing a displacement component signal in the direction of the feed axis (A axis), multipliers for multiplying a signal for controlling the feed rate along the feed axis (A axis) and a signal representative of the angle of the feed axis (A axis), and a second coordinate conversion circuit for converting the feed rate along the feed axis (A axis) into signals for controlling the feed rates in the X- and the Y-axis. Since the direction of feed can be set up simply by applying to the first and second coordinate conversion circuits the signal representative of the angle of the feed axis, the system does not require a mechanical moving element (such as a resolver or the like) and is simple in construction and easy to manipulate.

It will be apparent that many modifications and variations may be effected without departing from the scope of the novel concepts of this invention.

What is claimed is:

1. A tracer control system for controlling the relative position of a tracer head with respect to a model to be traced by displacement signals from said tracer head by moving said tracer head in at least one selected plane perpendicular to the X-Y plane in a coordinate system corresponding to the displacement signals of said tracer head, each said selected plane being predetermined by selecting a corresponding feed axis in said X-Y plane, the direction of each said feed axis being determined by specifying the corresponding angle of intersection of each said selected plane and the X-Z plane of said coordinate system, said system comprising:

means for providing input signals comprising selected trigonometric functions of each said angle of intersection;

a first coordinate conversion circuit comprising multipliers for selectively multiplying said input signals representative of each said angle of intersection with the respective displacement signals of the tracer head corresponding to the X and the Y axes, and adding means for selectively adding together output signals from the multipliers to output each respective component of the resultant displacement signal along each said respective selected feed axis in the X-Y plane;

a displacement direction index circuit for outputting selected trigonometric functions of the angle between the X-Y plane and the projection of said displacement signal in said at least one selected plane, said index circuit comprising means for utilizing the output from the first coordinate conversion circuit corresponding to said at least one selected plane and the tracer head displacement signal along the Z-axis to provide said output of the index circuit;

a control signal distributing circuit which is supplied with a normal velocity signal and a tangential velocity signal derived from the resultant displacement signal corresponding to the tracer head displacement signals along the X-, Y- and Z-axes and the output signal from the displacement direction index circuit to provide a velocity signal component along said at least one feed axis and a velocity signal component along the Z-axis for said tracing of said model in said at least one selected plane;

a second coordinate conversion circuit composed of multipliers for multipying the feed axis velocity signal from the control signal distributing circuit and the signals representative of the direction of said at least one selected feed axis in the X-Y plane, and means for distributing control signals indicative of the corresponding feed rates along the X- and Y-axes in accordance with the signals representative of the direction of the at least one selected feed axis.

2. The system of claim 1, wherein the signals representative of the direction of the at least one selected feed axis in the X-Y plane are signals representative of the cosine and the sine of said intersection angle of said at least one selected plane containing said at least one feed axis in said coordinate system.

3. The system of claim 1, wherein the signals representative of the direction of at least one selected feed axis are analog signals that are converted by a DA converter from binary data read out from a memory.

4. The system of claim 2, wherein the first coordinate conversion circuit comprises first and second multipliers for multiplying the signal representative of the cosine of said intersection angle of the at least one selected feed axis and the tracer head displacement signals along the X- and Y-axes, third and fourth multipliers for multiplying the signal representative of the sine of said angle of intersection and the tracer head displacement signals along the X- and Y-axes, a first adder for adding together the output signals from the first and fourth multipliers, and a second added for adding together the output signals from the second and third multipliers.

5. The system of claim 4 comprising a circuit-changing switch for selectively applying the output signals corresponding to each of said selected planes corresponding to each selected feed axis from the first and second adders to the displacement direction index circuit.

6. The system of claim 5, comprising means for operating with two of said selected planes corresponding to two of said selected feed axes, said two selected feed axes being perpendicular to each other, and said circuit changing switch alternately outputting the corresponding outputs to said displacement direction index circuit.

* * * * *

UNITED STATES PATENT AND TRADEMARK OFFICE
CERTIFICATE OF CORRECTION

PATENT NO. : 4,334,272
DATED : June 8, 1982
INVENTOR(S) : Imazeki et al

It is certified that error appears in the above-identified patent and that said Letters Patent is hereby corrected as shown below:

Col. 2, line 48, "sin$\alpha$ " should be -- sin $\alpha$ --;
line 20, "$ft$" should be --ft--;
line 22, "$\phi$ " should be -- $\alpha$ --;
line 22, "$\omega$ " should be -- $\omega t$ --;
line 24, "$\phi$ " should be -- $\alpha$ --;
line 26, "$\Phi$ " should be -- $\alpha$ --;
line 65, " $\varepsilon_{\alpha+}$ 90°" should be $\varepsilon_{\alpha}+90°$--.

Signed and Sealed this

Fifth Day of April, 1988

*Attest:*

DONALD J. QUIGG

*Attesting Officer*   *Commissioner of Patents and Trademarks*